(12) United States Patent
Lee et al.

(10) Patent No.: US 6,268,709 B1
(45) Date of Patent: Jul. 31, 2001

(54) CHARGING DEVICE FOR A CELLULAR PHONE

(75) Inventors: Yung-Tang Lee; Chin-Long Liu, both of Taipei (TW)

(73) Assignee: Inventec Appliances Corp., Taipei (TW)

( * ) Notice: Subject to any disclaimer, the term of this patent is extended or adjusted under 35 U.S.C. 154(b) by 0 days.

(21) Appl. No.: 09/689,878

(22) Filed: Oct. 13, 2000

(51) Int. Cl.[7] .................................................. H01M 10/46
(52) U.S. Cl. .............................................................. 320/112
(58) Field of Search ..................................... 320/103, 107, 320/112, 116, 118, 127, 128; 429/96, 97, 99, 100, 149

(56) References Cited

U.S. PATENT DOCUMENTS 5,153,495 * 10/1992 Connors .
5,396,162 * 3/1995 Brilmyer .
5,973,476 * 10/1999 Irvin .

* cited by examiner

Primary Examiner—Edward H Tso
(74) Attorney, Agent, or Firm—Bacon & Thomas, PLLC

(57) ABSTRACT

A charging device for a cellular phone includes a first housing having a first receiving space provided with a plurality of terminals on an inner side wall thereof. One outer side wall of the first housing is connected pivotally to an outer side wall of a second housing. The second housing has a second receiving space in the same direction as the first receiving space. The inner wall of the second receiving space is provided with two conductors. A voltage multiplier circuit and a voltage stabilizing and rectifying circuit are disposed between the first and second housings. In use, a rechargeable battery of the cellular phone is disposed in the first receiving space, whereas conventional batteries are disposed in the second receiving space to permit charging of the rechargeable battery via the circuits. The charging device is convenient to use and does not occupy a lot of space.

8 Claims, 4 Drawing Sheets

CHARGING DEVICE FOR A CELLULAR PHONE

BACKGROUND OF THE INVENTION (a) Field of the Invention

The invention relates to a charging device for a cellular phone, more particularly to a charging device that can be coupled to a car/motorcycle remote controller or a key ring to permit the user to perform charging while walking or on a plane. The charging device utilizes conventional batteries (#3 or #4 batteries) as a power supply, and does not occupy much space and is convenient to carry and use.

(b) Description of the Prior Art

With the rapid advance of electronic and telecommunication products, more and more people use electronic and telecommunication equipment, e.g., cellular phones. However, finding a power supply needed by cellular phones has always been a problem to many users. Any type of battery charger requires an alternating current source. Manufacturers have launched different types of chargers to suit different models of cellular phones to meet users' needs.

Conventional chargers have the following drawbacks:

1. Conventional chargers are usually large in size and are inconvenient to carry around.
2. When the user wishes to recharge the cellular phone using a conventional charger, an alternating current connector has to be used.
3. If the user stays in a foreign country where the standard voltage is above 240V, a power adapter is required in order to conduct recharging.
4. If the user stays outdoors, and the cellular phone needs to be recharged, it will be very inconvenient.
5. If the user is on a trip, even though he/she has a charger with him/her, he/she cannot use it to recharge the cellular phone until he/she returns to the hotel or the place he/she is staying where he/she has to find an alternating current socket in order to recharge the cellular phone.

Therefore, there is a need for a cellular phone charging device that can be coupled integrally with a conventional car/motorcycle remote controller or key ring to facilitate carrying so that the user can recharge the phone while walking or on a plane. Besides, the charging device utilizes conventional batteries as a power supply therefor, which not only is convenient but also saves space.

SUMMARY OF THE INVENTION

The object of the invention is to provide a charging device for a cellular phone that can be coupled to a car/motorcycle remote controller or a key ring to permit the user to perform charging while walking or on a plane. The charging device utilizes conventional batteries (#3 or #4 batteries), which are commonly available in convenient stores and supermarkets, as a power supply, and does not occupy much space and is convenient to carry and use. Besides, the back cover of the cellular phone can be used as a part of the charging device.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
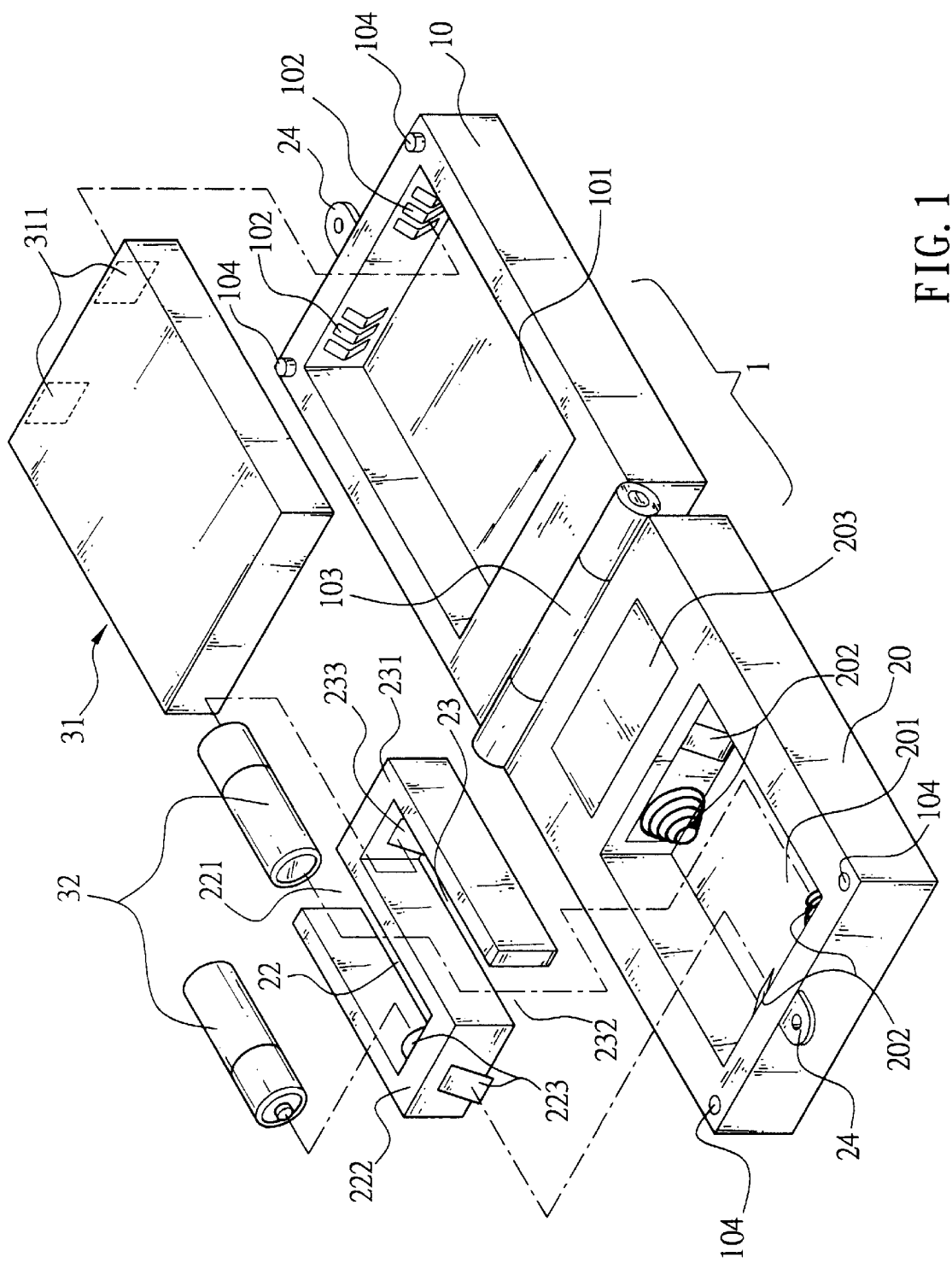
FIG. 1 is an exploded perspective view of the first preferred embodiment of the present invention.

With reference to FIG. 1, a charging device 1 for cellular phones according to the present invention includes a first housing 10. One side of the housing 10 is provided with a first receiving space 101. The part of the first housing 10 on an inner side wall at one end of the first receiving space 101 has a plurality of terminals 102 disposed thereon such that a rechargeable battery 31 of a cellular phone may be disposed in the first receiving space 101, and a conductive face 311 at one end of the battery 31 that can be just connected to the terminals 102.

The invention further includes a second housing 20, which has a second receiving space 201 disposed in the same direction as the first receiving space 101 of the first housing 10. The second housing 20 is provided with two first conductors 202 on opposite inner side walls of the second receiving space 201. Conventional batteries 32 (e.g., #3 batteries) may be inserted in to the second receiving space 201 such that positive and negative terminals thereof contact the first conductors 202.

Furthermore, a frame 21 having a Z-shaped cross section is fitted into the second receiving space 201. The frame 21 has first and second receiving chambers 22, 23. One end of the first receiving chamber is an open end 221, the other end being a closed end 222. Two opposite sides of the closed end 222 are respectively provided with a second conductor 223. One end of the second receiving chamber 23 adjacent to the open end 221 of the first receiving chamber 22 is a closed end 231, the other end being an open end 232. Two opposite sides of the closed end 231 arc respectively provided with a third conductor 233 such that when the frame 21 is fitted into the second receiving space 201, the second and third conductors 223, 233 on the two closed ends 222, 231 contact the first conductors 202 on the inner side walls of the second receiving space 201, whereby batteries 32 of a smaller specification (e.g., #4 batteries) can be disposed in the second receiving space 201 due to the arrangement of the first and second receiving chambers 22, 23.

In the present invention, the first and second housings 10, 20 are pivotally connected by means of a pivotal connecting element 103 such that the first and second housings 10, 20 are openable and closable relative to each other. In this embodiment, the connecting element 103 is a hinge.

Furthermore, the second housing 20 includes a voltage multiplier circuit 203 and a voltage stabilizing and rectifying circuit (not shown). The voltage multiplier circuit 203 is disposed to boost the work voltage by certain times, and the multiplied voltage is rectified by the voltage stabilizing and rectifying circuit to a work voltage required for charging. Since the operational principle of the multiplier circuit 203 is known in the art, a detailed description thereof is dispensed with herein.

In the invention, distal end portions of the first and second housings 10, 20 are provided with corresponding engaging elements 104 such that the engaging elements 104 on the first and second housings 10, 20 are inter-engaged when the first and second housings 20 are closed relative to each other. In the embodiment, the engaging elements 104 are projections and grooves for receiving the projections.

Figure 2:
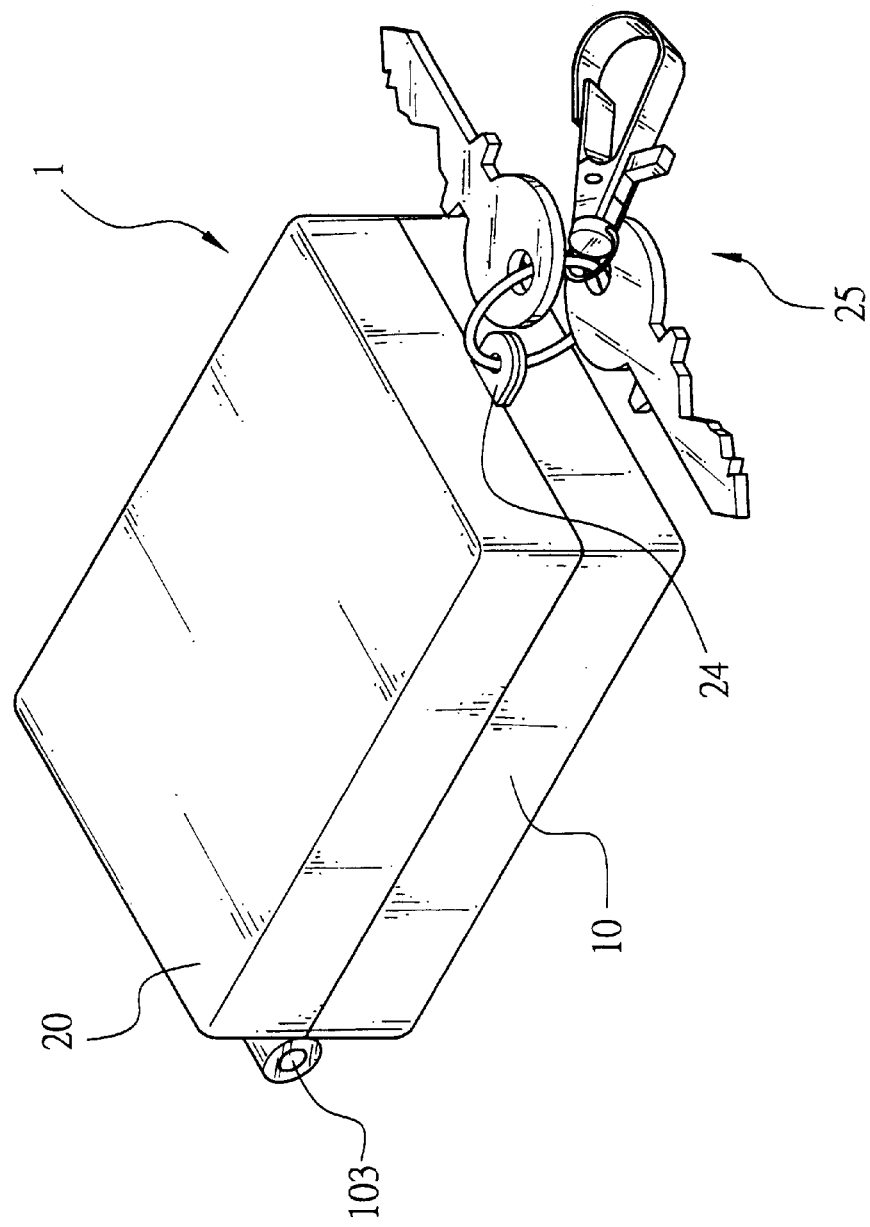
FIG. 2 is an assembled perspective view of the first preferred embodiment.

Referring to FIGS. 1 and 2, the distal ends of the first and second housings 10, 20 opposite to the pivotal connecting element 13 therebetween are respectively provided with a projecting ring 24 adapted for passage of a key ring 25 after closing of the charging device 1 so as to be coupled to a car/motorcycle remote controller. In this way, it is only necessary to put the rechargeable battery 31 of the cellular phone into the receiving space 101 and put conventional batteries 32 into the second receiving space 201 in order to conduct charging of the rechargeable battery 3 1 via the voltage multiplier circuit 203 and the voltage stabilizing and rectifying circuit. As such, the invention improves over the prior art in terms of portability and user convenience. Besides, the invention does not occupy a lot of space.

Figure 3:
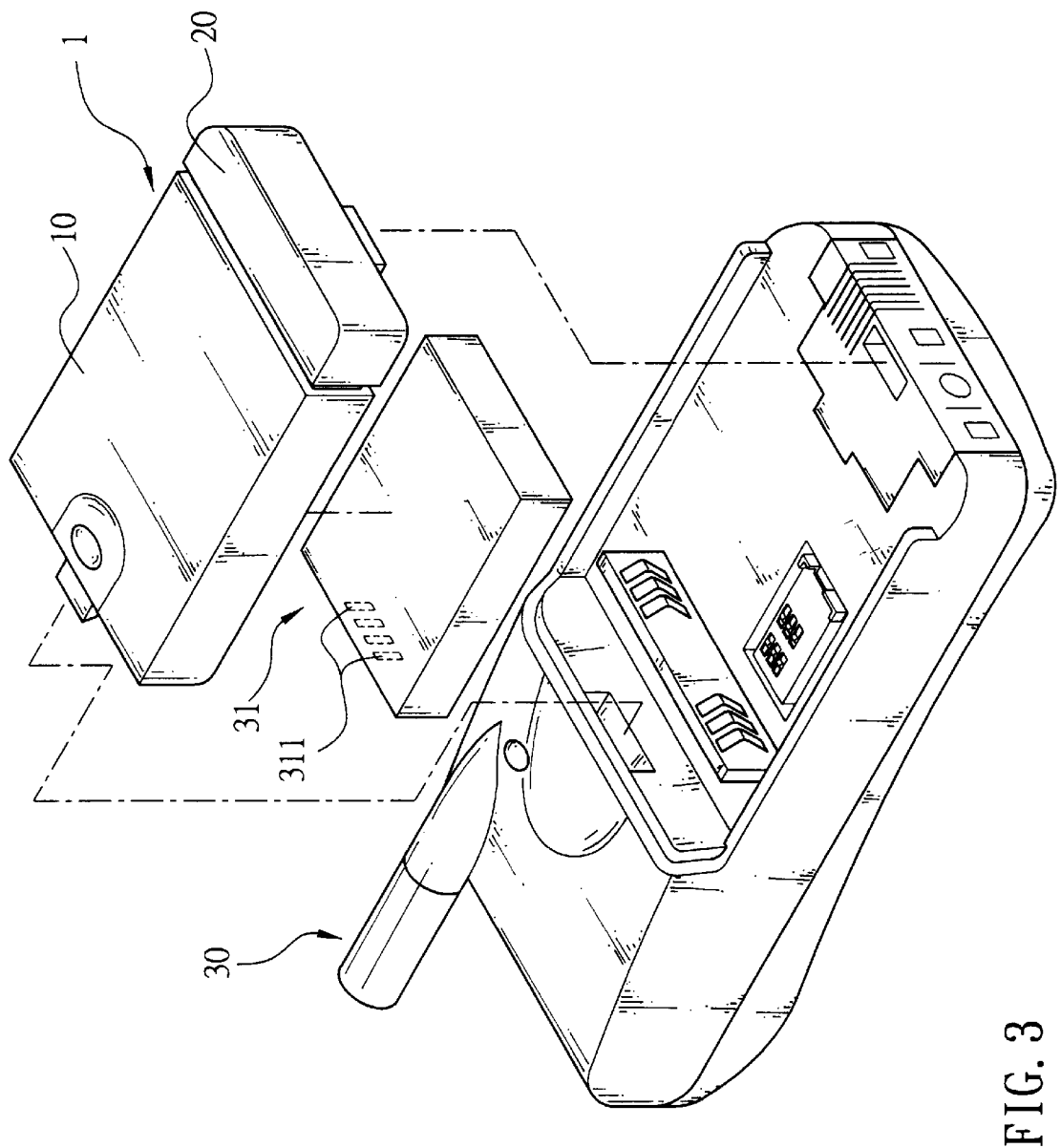
FIG. 3 is an exploded perspective view of the second preferred embodiment of the present invention.
Figure 4:
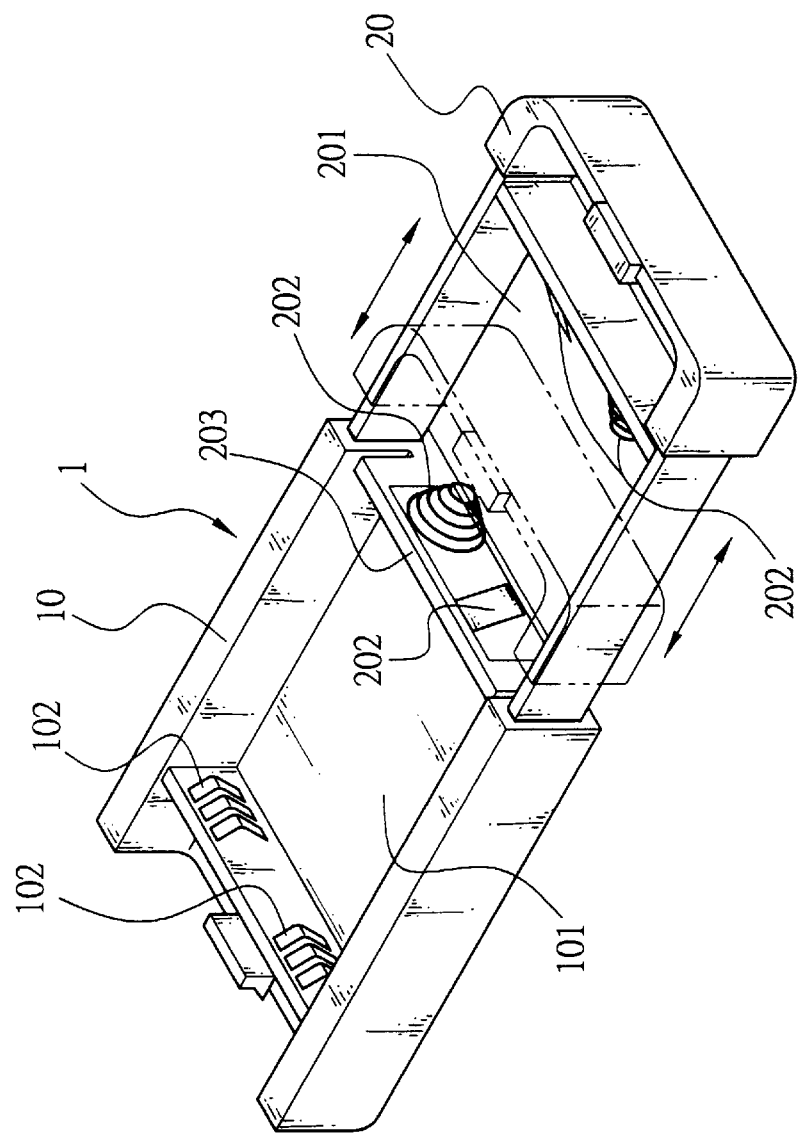
FIG. 4 is a perspective view of the second preferred embodiment.

Referring to FIGS. 3 and 4, which show another preferred embodiment of the invention, the first housing 10 of the charging device 1 may be a back cover of the rechargeable battery 31 of the cellular phone 30, and is likewise provided with the first receiving space 101 and terminals 102. One end of the second housing 20 is movably insertable along the outer peripheral wall at one end of the first housing 10, and is provided with the second receiving space 201 and conductors 202. Besides, the voltage multiplier circuit 203 may be disposed between the first and second receiving spaces 101, 201. Normally, the second housing 20 is retracted into the outer peripheral wall at one end of the first housing 10, with the distal end thereof exposed on the outside, and covers the back side of the cellular phone 30. In use, the second housing 20 is pulled outwardly of the first housing 10, and the rechargeable battery 31 of the cellular phone 30 can be disposed in the first receiving space 101, whereas the batteries 32 are disposed in the second receiving space 201 to recharge the rechargeable battery 31 via the voltage multiplier circuit 203 and stabilizing and rectifying circuit. The charging device can also perform direct charging on the cellular phone 30 like a traveler's charger. As such, the invention improves conventional battery chargers and provides user facility and reduces space.

Although the present invention has been illustrated and described with reference to the preferred embodiment thereof, it should be understood that it is in no way limited to the details of such embodiment but is capable of numerous modifications within the scope of the appended claims.

What is claimed is:

1. A charging device for a cellular phone, comprising:
   a first housing, one side of said housing being provided with a first receiving space, said first housing having an inner side wall at one end thereof which is provided with a plurality of terminals, said first receiving space being adapted to receive a rechargeable battery of the cellular phone such that a conductive face at one end of the rechargeable battery contacts said terminals;
   a second housing, said second housing being provided with a second receiving space in the same direction as said first receiving space, said second receiving space being respectively provided with two first conductors on opposite inner side walls thereof, an outer side wall at one end of said second housing being connected to an outer side wall at one end of said first housing, said second receiving space being adapted to receive conventional batteries which have positive and negative ends that contact said first conductors; and
   voltage multiplier circuit and a voltage stabilizing and rectifying circuit provided between said second and first receiving spaces;
   whereby the rechargeable battery of the cellular phone can be disposed in said first receiving space, whereas conventional batteries can be disposed in said second receiving space to charge the rechargeable battery via said voltage multiplier circuit and said voltage stabilizing and rectifying circuit.

2. The charging device of claim 1, wherein said first housing is a back cover of the rechargeable battery of the cellular phone, one end of said second housing being movably insertable into an outer peripheral wall at one end of said first housing, with the other end exposed on the outside, and covering the back side of the cellular phone such that in use, said second housing can be pulled outwardly of said first housing for use.

3. The charging device of claim 2, wherein said second receiving space receives a frame having a Z-shaped cross section, said frame including first and second receiving chambers, one end of said first receiving chamber being an open end, the other end thereof being a closed end, two sides of said closed end being respectively provided with a second conductor, one end of said second receiving chamber adjacent to said open end of said first receiving chamber being a closed end, the other being an open end, two sides of said closed end being respectively provided with a third conductor such that when said frame is fitted into said second receiving space, said second and third conductors on said two closed ends of said frame can contact said first conductors on said inner side walls of said second receiving space, and such that conventional batteries of a smaller size can be disposed in said first and second receiving chambers.

4. The charging device of claim 1, wherein said outer side wall at one end of said first housing and said outer side wall at one end of said second housing are pivotally connected by a pivotal connecting element such that said first and second housing are closable relative to each other with said connecting element as a pivot.

5. The charging device of claim 4, wherein said first and second housings respectively have a distal end portion, said distal end portions thereof being provided with corresponding engaging elements such that said engaging elements on said first and second housings are inter-engaged firmly when said first and second housings are closed relative to each other.

6. The charging device of claim 5, wherein said engaging elements are projections and grooves for receiving said projections.

7. The charging device of claim 5, wherein said first and second housing are respectively provided with a projecting ring at said distal end such that after said first and second housings are closed relative to each other, said projecting rings of said first and second housings are coupled to allow passage of a key ring so that said charging device can be coupled integrally to a car/motorcycle remote controller to permit charging while the user is walking or on a plane.

8. The charging device of claim 7, wherein said connecting element is a hinge.

* * * * *